Sept. 30, 1958     C. W. SIMONSEN     2,854,111
WHEEL HUB CLUTCHES

Filed Dec. 7, 1956     2 Sheets-Sheet 1

INVENTOR.
Charles W. Simonsen
BY
ATTORNEY

Sept. 30, 1958 — C. W. SIMONSEN — 2,854,111
WHEEL HUB CLUTCHES
Filed Dec. 7, 1956 — 2 Sheets-Sheet 2
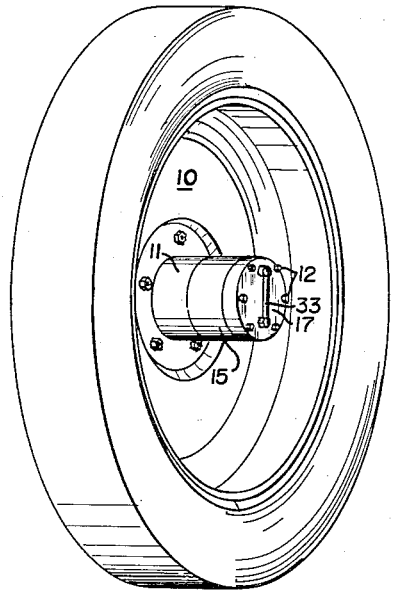
Fig. 8
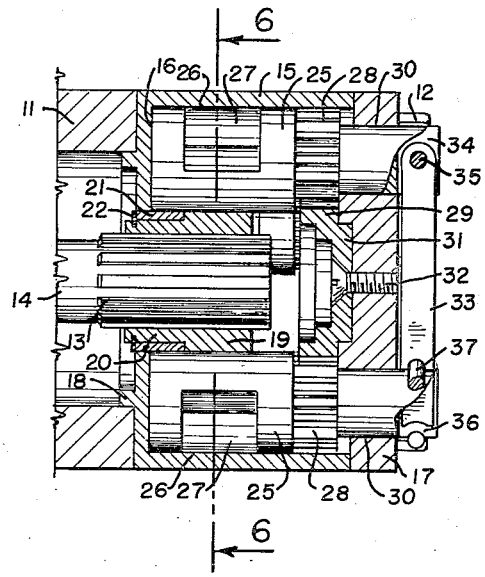
Fig. 5
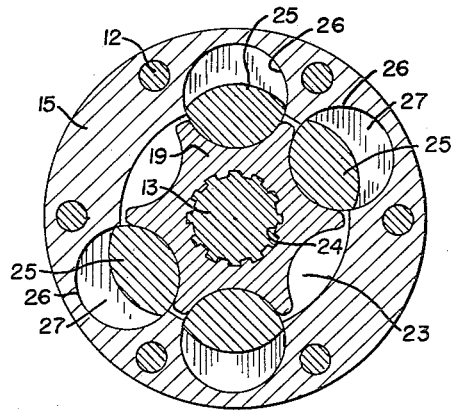
Fig. 6
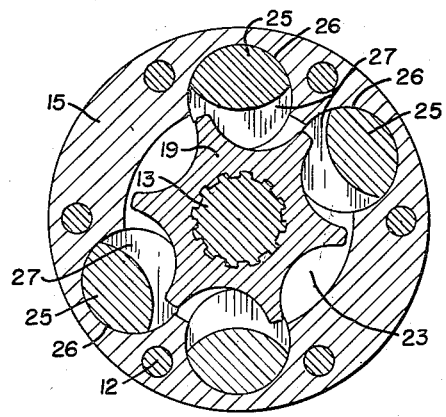
Fig. 7
INVENTOR.
Charles W. Simonsen
BY
ATTORNEY United States Patent Office 2,854,111
Patented Sept. 30, 1958

2,854,111

WHEEL HUB CLUTCHES

Charles W. Simonsen, Longmont, Colo.

Application December 7, 1956, Serial No. 626,914

7 Claims. (Cl. 192—71)

This invention relates to a hub cap for use on the wheels of a four-wheel-drive vehicle and has for its principal object the provision of a hub-cap-clutch which will allow the front wheels of a four-wheel-drive vehicle to be quickly and easily disconnected from their driving axles when the full four-wheel-drive is not required or desired.

Four-wheel-drive vehicles are designed for use upon exceedingly steep or difficult roads and under excessive load conditions where the traction furnished by the conventional two-wheel-drive would be insufficient. Under ordinary travel conditions where the four-wheel-drive is unnecessary, the four-wheel-drive and its associated mechanism, interferes with fast, economical and facile driving. It is therefore, highly desirable to provide means for disconnecting the front wheels of a vehicle from the driving mechanism so they may function simply for conventional steering purposes under ordinary road conditions, thus avoiding the power consuming interference and drag of the four-wheel-drive mechanism when the latter is neither required or desired. An object of this invention is to provide such a means and to so design the means that it may be quickly and easily installed as a replacement for the conventional hub caps with which such vehicles are provided.

A further object is to provide a wheel hub clutch which will require no changes in the vehicle structure or parts thereof; which can be quickly and easily converted for either two or four-wheel-drive regardless of the position of the wheels and without the use of tools of any kind; and which will be exceedingly rugged and long-lived when subject to heavy use requirements.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 5 is a longitudinal section taken on the line 5—5, Fig. 3;

Fig. 6 is a cross section taken on the line 6—6, Fig. 5, illustrating the improved wheel hub clutch in the engaged or four-wheel-drive position;

Fig. 7 is a similar cross section illustrating the clutch in the disengaged or two-wheel-drive position; and Fig. 8 is a reduced scale perspective view illustrating the improved wheel hub clutch in place on a front wheel of a conventional four-wheel-drive vehicle.

Figure 1:
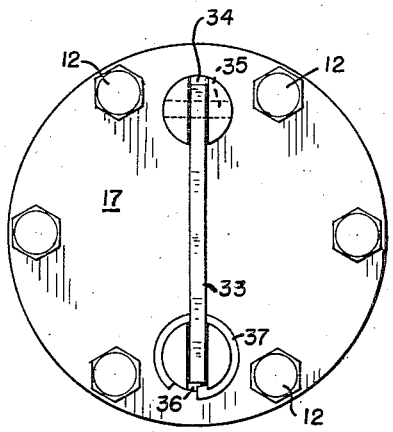
Fig. 1 is a face view of the improved wheel hub clutch.
Figure 2:
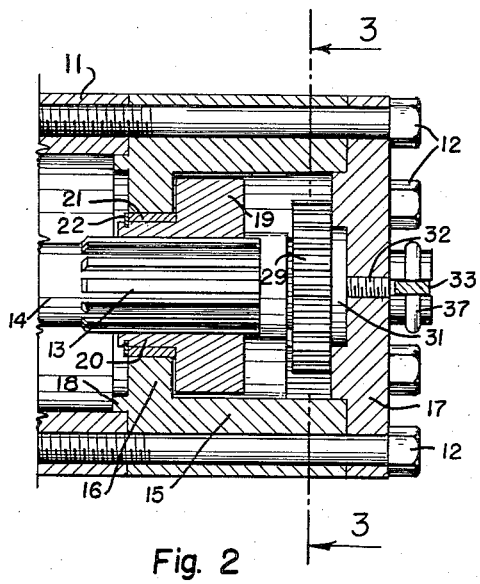
Fig. 2 is a longitudinal section therethrough taken on the line 2—2, Fig. 3.
Figure 3:
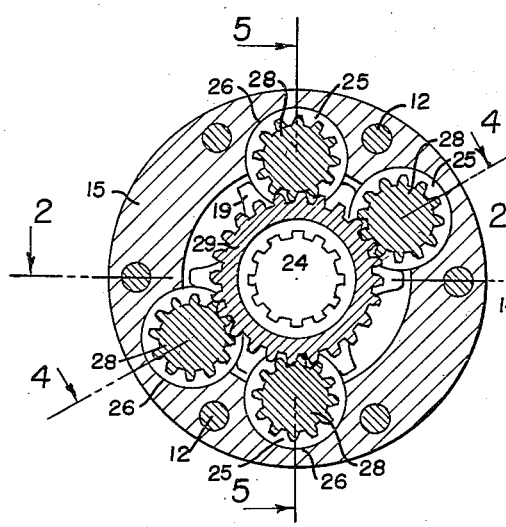
Fig. 3 is a cross-section therethrough taken on the line 3—3, Fig. 2.
Figure 4:
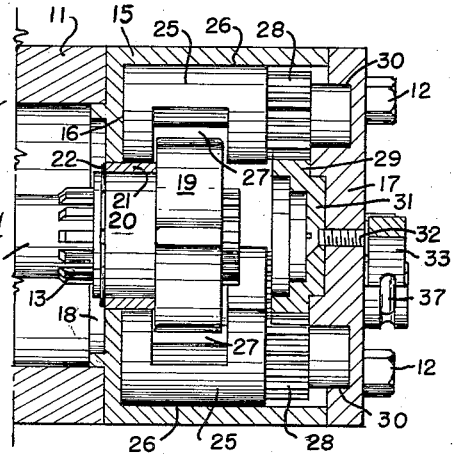
Fig. 4 is a longitudinal section taken on the line 4—4, Fig. 3.

In the usual four-wheel-drive vehicle, the wheels are provided with hub caps which are secured to the hubs of the wheels by means of cap screws. Each hub cap is provided with an internal splined socket for receiving the splined extremity of a drive axle member whereby power is transmitted from the axle member to the wheel. This invention simply replaces the usual hub caps on the two front wheels of the vehicle.

Such a wheel is illustrated at 10 in Fig. 8 having a conventional hub 11 upon which the usual hub cap is ordinarily mounted by means of six cap screws 12. The hub 11 surrounds a splined extremity 13 formed on an axle member 14. The conventional cap receives the latter splined extremity and locks the wheel 10 thereto.

The improved wheel hub clutch mechanism is enclosed in a cylindrical housing 15. The inner extremity of the housing 15 is provided with a bottom portion 16 and the outer extremity thereof is closed by means of a circular cap plate 17. The bottom portion 16 is formed with an annular concentric flange 18 adapted to be fitted within the wheel hub 11 to concentrically align and support the housing 15 thereon. The housing 15 and its cap plate 17 are secured upon the hub by means of the cap screws 12, which are usually employed for holding the conventional hub cap in place.

A star wheel 19 is rotatably mounted in the housing. The star wheel 19 is supported from a tubular bearing sleeve 20 which is formed on one side of the wheel. The sleeve 20 is journalled in a bearing bushing 21 concentrically positioned in the bottom portion 16 of the housing 15. The bearing sleeve 20 is locked in place in the bearing bushing 21 by means of a suitable snap ring 22. The star wheel is provided with a plurality (preferably six) of equally-spaced, semi-circular, peripheral notches 23 positioned intermediate the teeth thereon and is provided with an internally splined shaft bore 24 adapted to be slidably mounted on the splined extremity 13 in mesh with the splines thereon.

A plurality of rotatable clutch keys 25 (preferably four) are rotatably mounted in semi-circular receiving sockets 26 in the wall of the housing 15. The keys are so spaced that they may simultaneously enter and closely engage the notches 23 in the star wheel 19, as shown in Fig. 6. Each of the keys 25 has a transversely extending notch 27 milled therein so that when the keys are rotated 180° from the fully engaged position, the star wheel 19 will be free to rotate through the notches 27 in the keys 25 as shown in Fig. 7.

Each of the keys 25 is provided with a spur gear 28 mounted or formed thereon. All of the gears 28 constantly mesh with a common sun gear 29 so that the rotation of any key is communicated to all of the other keys. A bearing boss 31 on the sun gear 29 is rotatably journalled in a concentric bearing socket in the cap plate 17 in which it is retained by means of the pivot screw 32.

The outer extremities of two oppositely positioned keys 25 are journalled in bearing sockets 30 in the cap plate 17. The outer extremities of the remaining two oppositely positioned keys 25 extend through the cap plate 17 and a locking lever 33 is hingedly mounted in a furcation 34 in the projecting extremity of one of the latter keys upon a suitable hinge pin 35. The locking lever 33 is sufficiently long so that it may be swung into a diametrically extending receiving notch 36 in the opposite key 25. The locking lever can be locked in the receiving notch 36 by means of a resilient locking ring 37, which passes through the lever 33 and which can be snapped into a circumferential ring groove in the key.

The relation between the spur gears 28, the sun gear 29, and the locking lever 33 is such that when the locking lever 33 is in place in its receiving notch 36 the notches 27 of the keys will be either in the position of Fig. 6 or the position of Fig. 7.

Let us assume that when the locking lever is in the position of Fig. 1, the keys are in the position of Fig. 6. In this position, the solid portions of the keys are closely in mesh with the notches 23 of the star wheel 19 so that the axle member 14 is firmly attached to the housing 15, the hub 11 and the wheel 10 so that power delivered to the axle member 14 will be delivered to the wheel.

Now let us assume that it is desired to release the wheel from the axle member 14. It is only necessary to force the locking ring 37 from place to release the locking lever 33. The latter lever is then used as a wrench or lever to rotate the key, to which it is hinged, 180° after which the locking lever 33 is swung completely across the key and returned to the receiving notch 36. This results, through the sun gear 29, in rotating all of the clutch keys 25 simultaneously 180° to the position of Fig. 7 at which time the housing 15 may rotate independently of the star wheel 19.

Thus, it can be seen that a four-wheel-drive vehicle can be quickly converted into a two-wheel-drive vehicle by simply releasing the locking levers 33 on the two front wheels and rotating them 180°. The vehicle can be returned to the four-wheel-drive position by simply rotating the locking levers 33 180° in either direction.

While a specific form of the improvement has been described and illustrated herein, it is desired to be understood that the same may be varied within the scope of the appended claims, without departing from the spirit of the invention.

Having thus described the invention, what is claimed and desired secured by Letters Patent is:

1. A wheel hub clutch for interconnecting a wheel hub to a splined extremity on a drive axle comprising: a housing; means for securing said housing to said hub about said splined extremity; a star wheel rotatably and concentrically mounted in said housing and having a splined axial passage adapted to receive the splined extremity of said drive axle; a plurality of elongated, generally cylindrical clutch keys rotatably mounted in said housing about the periphery of said star wheel parallel to the axis of the latter, each of said keys being provided with a notch positioned in the plane of said star wheel so that when said keys are rotated to one position they will interlock with said star wheel and when rotated to a second position said star wheel may rotate freely through the notches in said keys; gear teeth formed on each key; and a common sun gear rotatably mounted in said housing in mesh with the gear teeth of each of said keys to impart simultaneous rotation thereto.

2. A wheel hub clutch as described in claim 1 having means on the exterior of said housing connected with one of said keys for rotating the latter.

3. A wheel hub clutch as described in claim 1 in which one of said keys projects exteriorly of said housing and having lever means mounted on the exteriorly projecting portion of said latter key for rotating the latter.

4. A wheel hub clutch as described in claim 3 having means for locking said lever means in preset positions.

5. A wheel hub clutch as described in claim 3 in which the lever means comprises a locking lever hingedly mounted on the exteriorly projecting portion of said one key so as to extend radially thereof and adapted to engage a second exteriorly-projecting and oppositely-positioned key.

6. A wheel hub clutch as described in claim 5 having means for detachably latching said locking lever to said second key.

7. A wheel hub clutch for interconnecting a wheel hub to a splined extremity on a drive axle comprising: a housing; means for securing said housing to said hub about said splined extremity; a star wheel rotatably and concentrically mounted in said housing and having a splined axial passage adapted to receive the splined extremity of said drive axle; a plurality of elongated, generally cylindrical clutch keys rotatably mounted in said housing about the periphery of said star wheel parallel to the axis of the latter, each of said keys being provided with a notch positioned in the plane of said star wheel so that when said keys are rotated to one position they will interlock with said star whel and when rotated to a second position said star wheel may rotate freely through the notches in said keys; and means on the exterior of said housing connected with one of said keys for rotating the latter.

References Cited in the file of this patent

UNITED STATES PATENTS

| | | |
|---|---|---|
| 2,502,859 | Laxo | Apr. 4, 1950 |
| 2,684,140 | Warn | July 20, 1954 |

FOREIGN PATENTS

| | | |
|---|---|---|
| 223,904 | Great Britain | Printed 1926 |